(12) United States Patent
Bowman et al.

(10) Patent No.: US 10,081,439 B1
(45) Date of Patent: Sep. 25, 2018

(54) METHODS AND APPARATUS TO COOL A VEHICLE HEAT SOURCE

(71) Applicant: The Boeing Company, Chicago, IL (US)

(72) Inventors: Timothy Edward Bowman, Cottleville, MO (US); William Webster Behrens, St. Louis, MO (US); Thomas W. Omohundro, Saint Charles, MO (US); Jeffrey M. Roach, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 992 days.

(21) Appl. No.: 13/922,960

(22) Filed: Jun. 20, 2013

(51) Int. Cl.
*B64D 37/34* (2006.01)
*F02C 7/14* (2006.01)
*F02C 7/224* (2006.01)
*B64D 37/00* (2006.01)

(52) U.S. Cl.
CPC ........... *B64D 37/005* (2013.01); *B64D 37/00* (2013.01); *B64D 37/34* (2013.01)

(58) Field of Classification Search
CPC ........... H05K 7/20845; H05K 7/20854; H05K 7/20872; B64D 37/34; F02C 7/14; F02C 7/224; F28D 2021/0021
USPC .................... 165/41, 202; 244/117 A, 135 R
See application file for complete search history.

(56) References Cited

U.S. PATENT DOCUMENTS

| 2,930,553 | A | * | 3/1960 | Greenough | ........... | B64D 13/006 165/41 |
| 3,093,348 | A | * | 6/1963 | Schelp | .................... | B64C 30/00 102/378 |
| 3,158,197 | A | * | 11/1964 | Blezard | .................. | B64D 13/00 165/104.31 |
| 4,505,124 | A | * | 3/1985 | Mayer | .................... | B64D 37/34 123/553 |
| 4,550,561 | A | * | 11/1985 | Coffinberry | ............... | F02C 7/14 60/736 |
| 4,705,100 | A | * | 11/1987 | Black | ...................... | F01D 25/18 123/553 |
| 4,776,536 | A | * | 10/1988 | Hudson | .................. | B64D 37/34 244/117 A |
| 4,809,934 | A | * | 3/1989 | Rix | ........................ | B64D 37/34 244/135 R |
| 5,149,018 | A | * | 9/1992 | Clark | ........................ | B64C 1/38 165/908 |

(Continued)

*Primary Examiner* — Grant Moubry
*Assistant Examiner* — For K Ling
(74) *Attorney, Agent, or Firm* — Hanley, Flight & Zimmerman, LLC

(57) ABSTRACT

Methods and apparatus to cool a vehicle heat source are disclosed herein. An example apparatus includes a first tank and a second tank. The first tank and the second tank are disposed on a vehicle. The second tank is in fluid communication with the first tank. An engine of the vehicle is to be supplied with fuel from at least one of the first tank or the second tank. The example apparatus also includes a cooling system disposed on the vehicle to cool the fuel flowing from the first tank to the second tank. The example apparatus further includes a heat exchanger operatively coupled to a heat source disposed on the vehicle. The fuel from the second tank is to flow to the first tank via the heat exchanger to cool the heat source.

11 Claims, 10 Drawing Sheets

(56) References Cited

U.S. PATENT DOCUMENTS

| | | | |
|---|---|---|---|
| 5,660,358 A * | 8/1997 | Grafwallner | B64D 37/14 |
| | | | 137/565.17 |
| 7,073,751 B1 * | 7/2006 | Tighe | B64C 17/10 |
| | | | 244/135 C |
| 7,383,851 B2 | 6/2008 | Jacobsen et al. | |
| 7,484,429 B2 | 2/2009 | Adams et al. | |
| 2011/0147530 A1 * | 6/2011 | Rahman | B64D 37/02 |
| | | | 244/135 C |
| 2012/0000205 A1 * | 1/2012 | Coffinberry | B64D 13/06 |
| | | | 60/806 |

\* cited by examiner

METHODS AND APPARATUS TO COOL A VEHICLE HEAT SOURCE

STATEMENT REGARDING FEDERALLY SPONSORED RESEARCH OR DEVELOPMENT

This disclosure was made with Government support under Contract No. FA8650-11-2-2138 awarded by the United States Air Force/Air Force Materiel Command. The Government of the United States may have certain rights in this disclosure.

FIELD

This disclosure relates generally to vehicle heat sources and, more particularly, to methods and apparatus to cool a vehicle heat source.

BACKGROUND

Generally, during operation of an aircraft engine, fuel flows from a tank to the aircraft engine. As the fuel flows from the tank to the aircraft engine, a large quantity of the fuel may be used as a heat sink to cool a fluid employed to operate the aircraft engine and/or other equipment on an aircraft. For example, the fuel may pass through a fuel-to-oil heat exchanger between the tank and the engine to cool oil lubricating the aircraft engine. Generally, a temperature of the fuel stored in the tank is increased by operating conditions of the aircraft such as, for example, a temperature of an environment in which the aircraft is disposed and/or heat generated by the aircraft. Such an increase in fuel temperature may be undesirable for various reasons.

SUMMARY

Methods and apparatus to cool a vehicle heat source are disclosed herein. An example apparatus includes a first tank and a second tank. The first tank and the second tank are disposed on a vehicle. The second tank is in fluid communication with the first tank. An engine of the vehicle is to be supplied with fuel from the first tank or the second tank. The example apparatus also includes a cooling system disposed on the vehicle to cool the fuel flowing from the first tank to the second tank. The example apparatus further includes a heat exchanger operatively coupled to a heat source disposed on the vehicle. The fuel from the second tank is to flow to the first tank via the heat exchanger to cool the heat source.

An example method disclosed herein includes cooling fuel flowing from a first tank to a second tank. The first tank and the second tank are disposed on a vehicle. The example method further includes flowing the fuel from the second tank into a heat exchanger to cool a heat source disposed on the vehicle. The example method also includes flowing the fuel from the heat exchanger into the first tank.

Another example method disclosed herein includes filling at least a portion of a first tank with fuel at a first temperature. The example method also includes cooling the fuel from the first temperature to a second temperature less than the first temperature, and filling at least a portion of a second tank with the fuel at about the second temperature. The first tank and the second tank are disposed on a vehicle. The example method also includes flowing the fuel from the second tank to a heat exchanger to cool a heat source disposed on the vehicle and flowing the fuel from the heat exchanger to the first tank.

The features, functions and advantages that have been discussed can be achieved independently in various examples or may be combined in yet other examples further details of which can be seen with reference to the following description and drawings.

Figure 1:
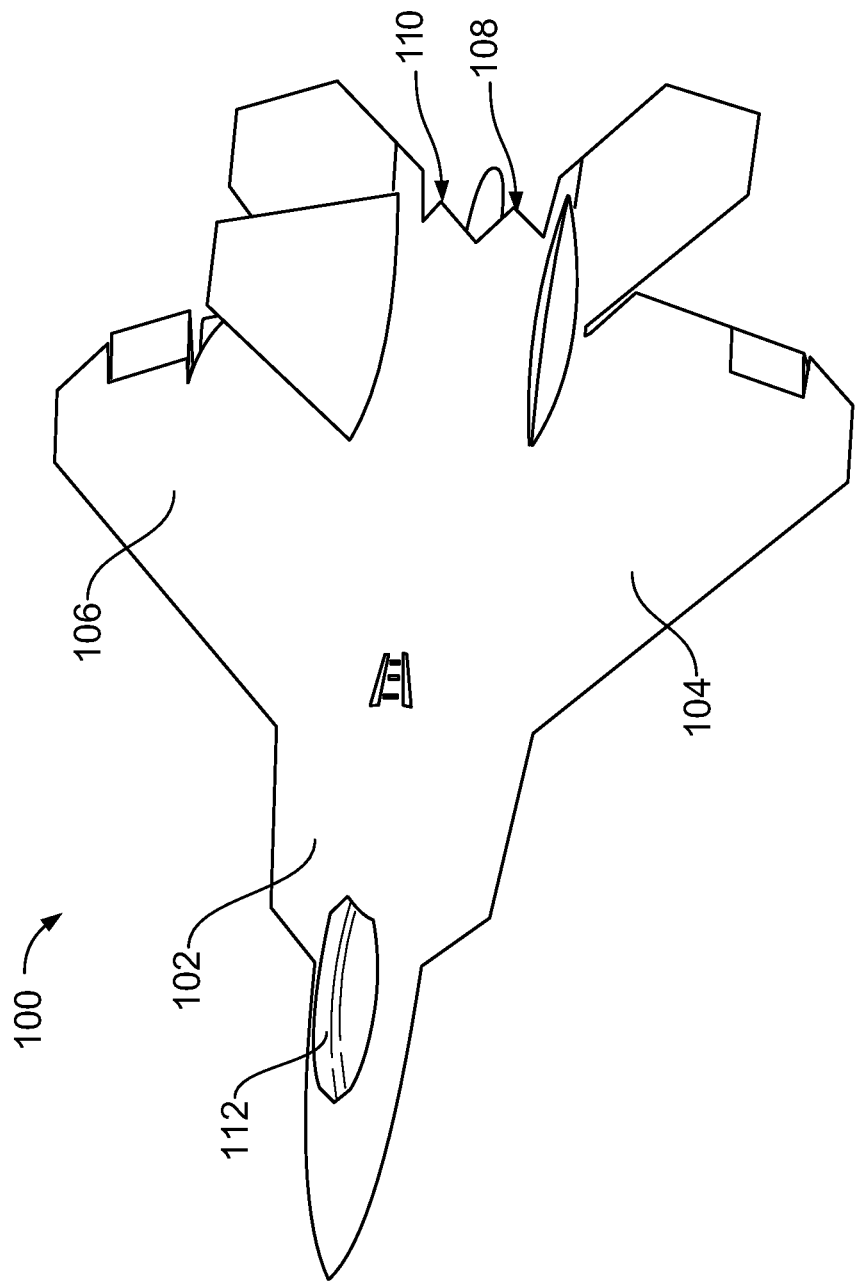
FIG. 1 illustrates an example aircraft in which aspects of the present disclosure may be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Methods and apparatus to cool a vehicle heat source are disclosed herein. In some examples, fuel stored in a vehicle is cooled from a first temperature to a second temperature, and fuel at or near the second temperature is used to cool a heat source such as, for example, a component of a weapon system disposed on the vehicle. In some examples, the fuel is circulated between two tanks disposed on the vehicle to cool the heat source. For example, the fuel may be cooled from the first temperature to the second temperature while the fuel is pumped from a first tank to a second tank via a fuel cooling system such as, for example, an evaporator. The fuel at the second temperature may be stored in the second tank, and fuel at the first temperature may be stored in the first tank. In some examples, the fuel in the first tank and/or the second tank supplies one or more engines of the vehicle with fuel.

To remove heat generated during operation of the heat source, fuel at the second temperature is pumped from the second tank to a heat source cooling system operatively coupled to the heat source. The fuel then flows through the heat source cooling system and returns to the first tank. The heat source cooling system may include one or more heat exchangers, and the fuel may function as a heat sink to remove heat from or cool the heat source. In some examples, the cold tank is replenished with fuel at the second temperature by pumping fuel from the first tank to the second tank via the fuel cooling system. In this manner, the fuel may be repeatedly or substantially continuously cooled and circulated between the first tank and the second tank to cool the heat source.

In some examples, a power of the heat source is larger than a capacity of a fuel cooling system, and the heat source operates on a limited duty cycle. For example, the power of the heat source may be ten times greater than the capacity of the fuel cooling system, and the heat source may operate on a 10 percent duty cycle such as, for example, 1 min heat source operation per 10 minutes of vehicle operation. To enable the heat source to transfer a sufficient amount of heat energy to the fuel without sizing the fuel cooling system for a peak heat load of the heat source, a given amount of the fuel that enables the sufficient amount of heat energy to be transferred to the fuel is cooled to a second temperature via the fuel cooling system and stored in the second tank prior to the operation of the heat source. As a result, the fuel stored in the second tank provides a thermal energy storage medium. In some examples, the fuel cooling system cools the given amount of the fuel over a period of time by transferring or flowing the fuel from the first tank to the second tank through the fuel cooling system. The period of time may be determined based on a desired capacity of the fuel cooling system relative to the power of the heat source that, for example, enables reduced energy consumption and/or maximizes range of the vehicle while enabling a predetermined operational capability. For example, the capacity of the fuel cooling system may reduce energy consumption by reducing a weight and/or a peak power of the fuel cooling system.

FIG. 1 illustrates an example aircraft 100 in which aspects of the present disclosure may be implemented. In the illustrated example, the aircraft 100 includes a fuselage 102, a first wing 104 and a second wing 106. A first engine 108 and a second engine 110 are disposed in the fuselage 102 aft of a canopy 112. The example aircraft of FIG. 1 is a fixed-wing aircraft for military applications. However, the example aircraft 100 of FIG. 1 is merely an example and, thus, the example methods and apparatus to cool a vehicle heat source disclosed herein may be implemented on other types of aircraft such as, for example, helicopters, passenger planes, etc. The example methods and apparatus may also be implemented on marine based vehicles and/or land based vehicles such as, for example, ships, tanks and/or any other vehicle.

Figure 2:
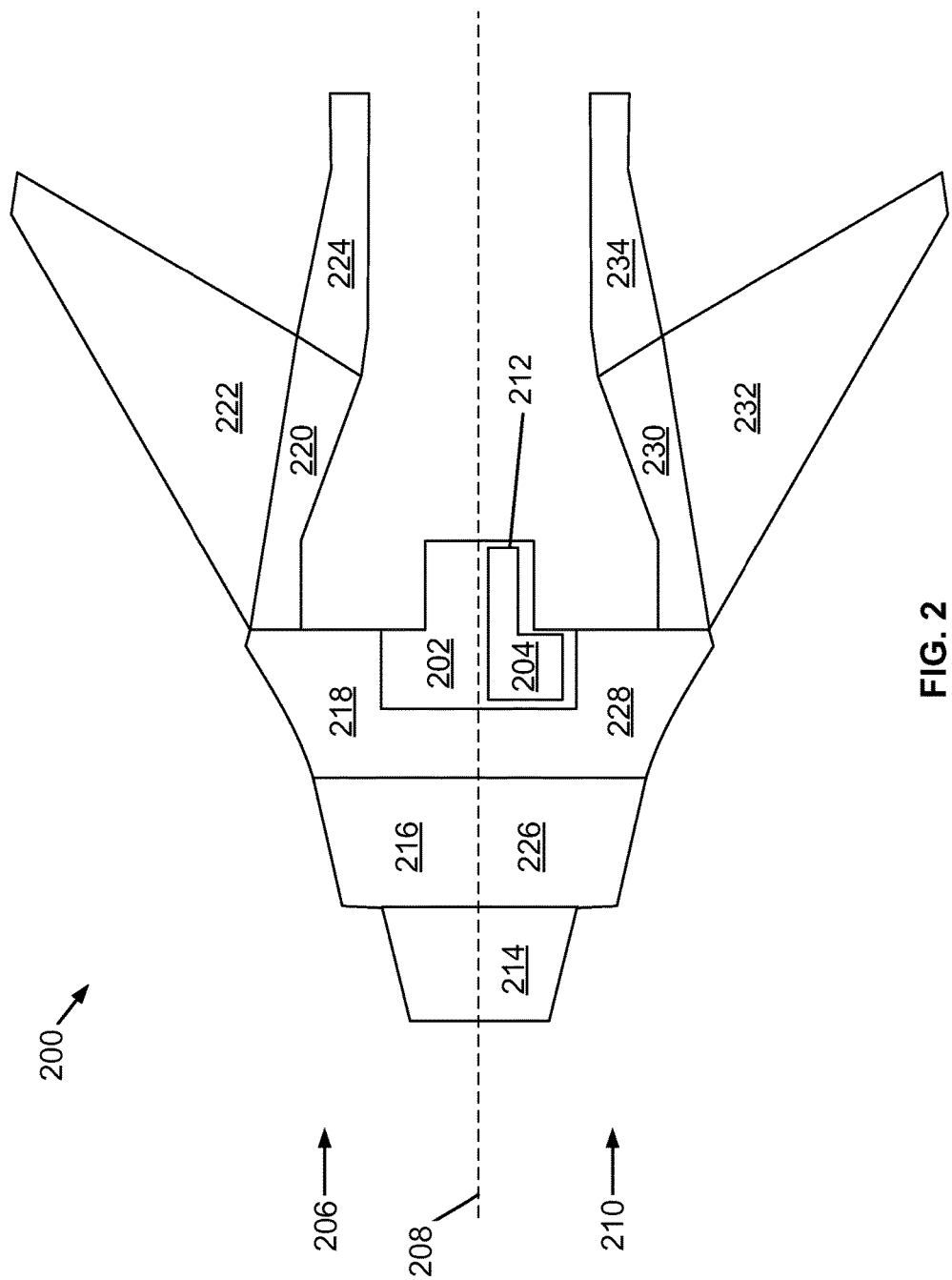
FIG. 2 illustrates an example fuel system of the aircraft of FIG. 1.

FIG. 2 is a schematic illustrating an example fuel system 200 of the example aircraft 100 of FIG. 1. The example aircraft 100 of FIG. 1 utilizes fuel stored in the fuel system 200 to cool a heat source 302 (FIG. 3) disposed on the aircraft 100. More specifically, the example aircraft 100 includes a heat source thermal management system 300 (FIG. 3) to cool the fuel from a first temperature to a second temperature less than the first temperature, and the fuel at or near the second temperature ("cooled fuel") is used to cool the heat source 302. In the illustrated example, two fuel tanks 202 and 204 are employed in the heat source thermal management system 300. The first tank 202 holds fluid having a temperature at or near the first temperature and, thus, is referred herein as "hot" tank 202. The second tank 204 holds fuel having a temperature at or near the second temperature and, thus, is referred herein as "cold" tank 204. In other examples, one or more additional and/or different fuel tanks may be employed in the heat source thermal management system 300.

In the illustrated example, the hot tank 202 is disposed on a right side 206 of the aircraft 100 adjacent a longitudinal axis 208 of the aircraft 100. The cold tank 204 may be disposed on a left side 210 of the aircraft 100 adjacent the longitudinal axis 208 of the aircraft 100 and the hot tank 202. In some examples, the cold tank 204 and/or the hot tank 202 are disposed adjacent and/or above a payload or weapons bay. In the illustrated example, the hot tank 202 and the cold tank 204 have substantially equal fuel volume capacities to facilitate a balanced left-to-right weight distribution of the example aircraft 100. For example, the hot tank 202 and the cold tank 204 may each hold about 2,600 pounds of fuel. In other examples, the hot tank 202 and the cold tank 204 have different fuel volumes and/or are disposed in different locations. For example, the cold tank 204 may have a greater fuel capacity or a smaller fuel capacity than the hot tank 202.

The cold tank 204 includes thermal insulation 212 to reduce and/or minimize an amount of heat transferred into the fuel stored in the cold tank 204. In some examples, the thermal insulation 212 substantially maintains the fuel in the cold tank 204 at or near the second temperature. The thermal insulation 212 may include aerogel insulation, Boeing Rigid Insulation (BRI) and/or any other suitable thermal insulation. The thermal insulation 212 may be disposed inside the cold tank 204 and/or substantially surround the cold tank 204. In some examples, the thermal insulation 212 defines a space inside the cold tank 204 to hold the fuel.

In the illustrated example, the fuel system 200 may include thirteen fuel tanks 202, 204, 214, 216, 218, 220, 222, 224, 226, 228, 230, 232 and 234. The example fuel tanks 202, 204, 214, 216, 218, 220, 222, 224, 226, 228, 230, 232 and 234 may be arranged on the example aircraft 100 substantially symmetrically relative to the longitudinal axis 208 of the aircraft 100. In the illustrated example, six of the fuel tanks 202, 216, 218, 220, 222, and 224 may be disposed on the right side 206 of the example aircraft 100, and six of the fuel tanks 204, 226, 228, 230, 232 and 234 are disposed on the left side 210 of the example aircraft 100. The fuel tank 214 may be disposed on the right side 206 and the left side 210 of the example aircraft 100 and along the longitudinal axis 208. In some examples, when the fuel tanks 202, 204, 214, 216, 218, 220, 222, 224, 226, 228, 230, 232 and 234 are substantially filled with fuel, an amount of fuel on the left side 210 of the aircraft 100 may be substantially the same as an amount of fuel on the right side 206 of the aircraft 100. Thus, the example arrangement of the fuel tanks 202, 204, 214, 216, 218, 220, 222, 224, 226, 228, 230, 232 and 234 on the aircraft 100 may facilitate a left-to-right weight balance of the aircraft 100. In other examples, the fuel tanks 202, 204, 214, 216, 218, 220, 222, 224, 226, 228, 230, 232 and 234 are sized and/or arranged on the aircraft 100 to facilitate other weight distributions.

Some or all of the example fuel tanks 202, 204, 214, 216, 218, 220, 222, 224, 226, 228, 230, 232 and 234 may be compartments defined by a frame, skin, one or more keels or ribs and/or other structural component(s) of the aircraft 100. In some examples, one or more of the fuel tanks 202, 204, 214, 216, 218, 220, 222, 224, 226, 228, 230, 232 and 234 are containers that are coupled to the example aircraft 100. For example, one or more of the fuel tanks 202, 204, 214, 216, 218, 220, 222, 224, 226, 228, 230, 232 and 234 may be suspended from one of the wings 104 and 106, disposed in a payload or weapon bay, etc.

The above-noted fuel system 200 is merely one example. Thus, other example vehicles used to implement the examples disclosed herein employ different fuel systems having, for example, a different arrangement of fuel tanks, other numbers (e.g., 1, 2, 3, 4, 5, 6, etc.) of fuel tanks, fuel tanks disposed at different locations in and/or on the vehicle, etc.

In some examples, the first engine 108 may be supplied with fuel from one or more of the fuel tanks 204, 226, 228, 230, 232 and 234 on the left side 210 of the aircraft 100 and/or the fuel tank 214 to control or manage a center of gravity of the aircraft 100. Similarly, the second engine 110 may be supplied with fuel from the one or more of the fuel tanks 202, 216, 218, 220, 222, and 224 on the right side 206 of the aircraft 100 and/or the fuel tank 214 to control or manage the center of gravity of the aircraft 100. In the illustrated example, the tank 230 may receive fuel from one or more of fuel tanks 204, 226, 228, 230, 232 and 234 on the left side 210 of the aircraft 100 and/or the tank 214 and direct the fuel to the first engine 108. Thus, the tank 230 is referred herein as first feed tank 230. The tank 220 may receive fuel from one or more of fuel tanks 202, 204, 216, 218, 220, 222, and 224 on the right side 206 of the aircraft 100 and/or the tank 214 and direct the fuel to the second engine 110. Thus, the tank 220 is referred to herein as second feed tank 220.

Figure 3:
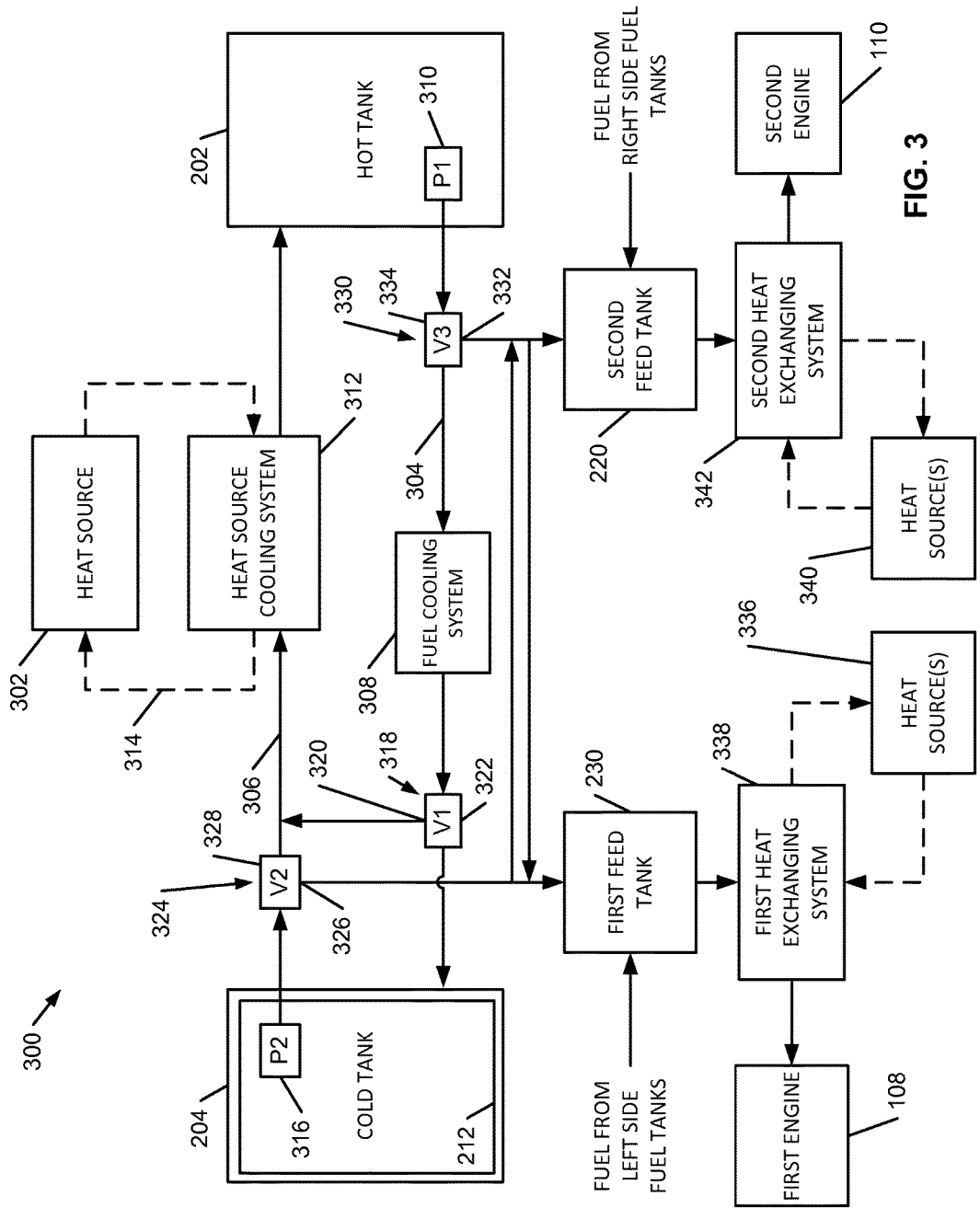
FIG. 3 illustrates an example heat source thermal management system of the example aircraft of FIG. 1.

FIG. 3 is a schematic of the example heat source thermal management system 300 disclosed herein. The heat source 302 may be one or more components of a radar system, an electrical power system, a weapon system such as, for example, a direct energy weapon and/or any other heat source disposed on the example aircraft 100. The heat source 302 may generate heat substantially continuously or periodically. In some examples, the heat source 302 generates heat when the heat source 302 is selectively operated. For example, the weapon system or a radar system may generate heat when activated. In some examples, an amount of heat generated by the heat source 302 fluctuates during operation of the aircraft 100. For example, the heat source 302 may generate varying amounts of heat over a given period of time. In some examples, to enable proper operation of the heat source 302, a temperature of the heat source 302 is kept below a threshold temperature and/or within a given temperature range (an "operational temperature range") such as, for example, approximately 68 degrees Fahrenheit to approximately 77 degrees Fahrenheit, or approximately 20 degrees Celsius to approximately 25 degrees Celsius.

In the illustrated example, the hot tank 202 is in fluid communication with the cold tank 204 via a first fuel path 304 and a second fuel path 306. A fuel cooling system 308 is disposed along the first fuel path 304 between the hot tank 202 and the cold tank 204. The example fuel cooling system 308 includes at least one heat exchanger such as, for example, an air-to-fuel heat exchanger (e.g., a Ram air heat exchanger), a refrigerant-to-fuel heat exchanger (e.g., employing R-134 refrigerant), a water-to-fuel heat exchanger, one or more evaporators and/or any other suitable heat exchanger(s). The example fuel cooling system 308 cools the fuel from the first temperature to the second temperature as the fuel flows from the hot tank 202 to the cold tank 204 along the first fuel path 304. In the illustrated example, the hot tank 202 includes a first pump 310 to flow fuel stored in the hot tank 202 through the fuel cooling system 308 and into the cold tank 204.

In the illustrated example, a heat source cooling system 312 is disposed along the second fuel path 306. In the illustrated example, the heat source cooling system 312 is operatively coupled to the heat source 302 to transfer heat from the heat source 302 to the fuel, thereby cooling the heat source 302 as the fuel passes along the second fuel path 306. The example heat source cooling system 312 may lower a temperature of the heat source 302 and/or enable the heat source 302 to be maintained in the operational temperature range. In some examples, the heat source cooling system 312 includes one or more cooling loops 314. The cooling loop(s) 314 may include one or more heat exchangers, pumps, valves and/or other suitable components to cool the heat source 302 via the fuel. In the illustrated example, the cooled fuel is utilized by the heat source cooling system 312 to cool the heat source 302.

In some examples, the cooled fuel stored in the cold tank 204 is flowed from the cold tank 204 to the heat source cooling system 312 to cool the heat source 302 to level load a heat load generated by the heat source 302. In the illustrated example, the cold tank 204 includes a second pump 316 to flow the cooled fuel from the cold tank 204 to the heat source cooling system 312. In some examples, the cooled fuel bypasses the cold tank 204 via a first bypass 318. In the illustrated example, the first bypass 318 is disposed between the fuel cooling system 308 and the cold tank 204 along the first fuel path 304. The example first bypass 318 may include a first split 320 to direct cooled fuel from the first fuel path 304 to the second fuel path 306 without flowing the cooled fuel into the cold tank 204. In some examples, the first bypass 318 includes a first valve 322 to control the flow of cooled fuel bypassing the cold tank 204. For example, if the first valve 322 is in a first position, the first bypass 318 may substantially prevent fuel from bypassing the cold tank 204 to fill at least a portion of the cold tank 204 with the cooled fuel. If the first valve 322 is in a second position, the first bypass 318 may direct substantially all of the cooled fuel from the fuel cooling system 308 to bypass the cold tank 204 and flow into the heat source cooling system 312. In some examples, the first valve 322 may be in a third position between the first position and the second position in which the first bypass 318 directs some of the cooled fuel to flow into the cold tank 204 and some of the cooled fuel to bypass the cold tank 204. As used herein, the movement of fuel between tanks or conveyed through various fluidic paths or courses can be equivalently described as flowing, transmitting, issuing, conducting, or moving. Similarly, the addition of fuel to a tank can be equivalently described as filling or replenishing and the emptying of fuel from a tank can be described as draining or depleting.

The fuel utilized by the example heat source thermal management system 300 supplies the first engine 108 and/or the second engine 110. In the illustrated example, the first engine 108 receives and/or is fed fuel from the first feed tank 230 during operation of the example aircraft 100. The example second engine 110 may receive and/or be fed fuel from the second feed tank 220. The example cold tank 204 is in fluid communication with the first feed tank 230 and the second feed tank 220 via a second bypass 324. In other examples, the cold tank 204 is in fluid communication with the first feed tank 230, the second feed tank 220, and/or one or more of the other fuel tanks 214, 216, 218, 222, 224, 226, 228, 232, and 234 disposed on the example aircraft 100. In some examples, the second bypass 324 includes a second split 326 and/or a second valve 328 to control the flow of fuel from the cold tank 204 to the first feed tank 230 and/or the second feed tank 220. For example, if the second valve 328 is in a first position, the second valve 328 may substantially prevent fuel in the cold tank 204 from flowing into the first feed tank 230 and/or the second feed tank 220 via the second bypass 324. If the second valve 328 is in a second position, the second bypass 324 may direct substantially all of the fuel flowing from the cold tank 204 to the first feed tank 230 and/or the second feed tank 220. In some examples, the valve may be in a third position between the first position and the second position in which the second bypass 324 directs some of the fuel flowing from the cold tank 204 to flow to the first feed tank 230 and/or the second feed tank 220 and some of the fuel to flow to the heat source cooling system 312.

In the illustrated example, the hot tank 202 is in fluid communication with the first feed tank 230 and the second feed tank 220 via a third bypass 330. In other examples, the hot tank 202 is in fluid communication with the first feed tank 230, the second feed tank 220, and/or one or more of the other fuel tanks 214, 216, 218, 222, 224, 226, 228, 232, and 234 disposed on the example aircraft 100. In some examples, the third bypass 330 includes a third split 332 and/or a third valve 334 to control the flow of fuel from the hot tank 202 to the first feed tank 230 and/or the second feed tank 220. For example, if the third valve 334 is in a first position, the third valve 334 may substantially prevent fuel in the hot tank 202 from flowing into the first feed tank 230 and/or the second feed tank 220 via the third bypass 330. If the third valve 334 is in a second position, the third bypass 330 directs substantially all of the fuel flowing from the hot tank 202 to the first feed tank 230 and/or the second feed tank 220. In some examples, the third valve 334 may be in a third position between the first position and the second position in which the third bypass 330 directs some of the fuel flowing from the hot tank 202 to flow to the fuel cooling system 308 and some of the fuel to flow to the first feed tank 230 and/or the second feed tank 220.

In the illustrated example, as the fuel flows from the first feed tank 230 to the first engine 108, the fuel is used to cool one or more heat sources 336 via a first heat exchanging system 338. The heat sources 336 may be, for example, components, systems, and/or fluids employed on the aircraft 100. For example, the fuel may be used to cool a generator, hydraulic fluid, oil, etc. In some examples, the first heat exchanging system 338 includes one or more heat exchangers, pumps, valves and/or other components.

Fuel flowing from the second feed tank 220 to the second engine 110 is used to cool one or more heat sources 340 via a second heat exchanging system 342. The heat sources 340 may be, for example, components, systems, and/or fluids employed on the aircraft 100. For example, the fuel may be used to cool a generator, hydraulic fluid, oil, etc. In some examples, the second heat exchanging system 342 includes one or more heat exchangers, pumps, valves and/or other suitable components.

Figure 4:
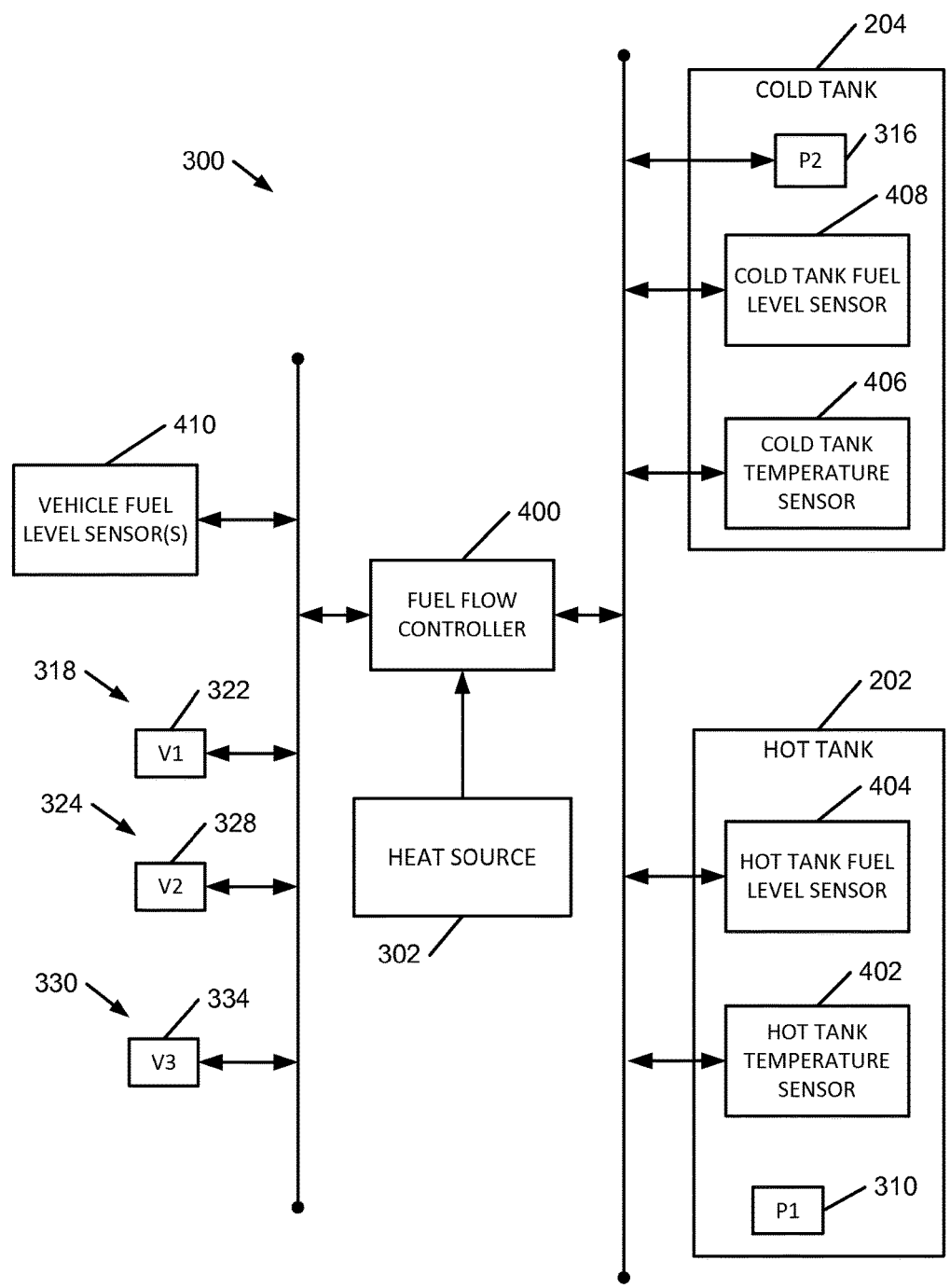
FIG. 4 is a block diagram representative of the example heat source thermal management system of FIG. 3 including an example fuel flow controller disclosed herein.

The example heat source thermal management system 300 of FIG. 3 may also include a fuel flow controller 400 (FIG. 4). As described in greater detail below in conjunction with FIG. 4, the fuel flow controller 400 controls the flow of fuel through the aircraft 100 and/or example heat source thermal management system 300. For example, the flow controller 400 controls the first pump 310, the second pump 316, the first valve 322, the second valve 328, the third valve 334, and/or other devices to circulate the fuel between the hot tank 202 and the cold tank 204 and/or supply fuel to the first engine 108 and/or the second engine 110.

The example aircraft 100 may be operated to carry out a mission. The example mission discussed below includes a first stage, a second stage and a third stage in which the example aircraft 100 is used to perform one or more actions. For example, the first stage of the mission may include the aircraft 100 taxiing, taking off, flying toward a first destination, etc. In some examples, the second stage of the mission includes selectively operating the heat source 302 during flight by, for example, activating a radar system or a weapon system, and the third stage of the mission includes flying the aircraft 100 toward the first destination or a second destination, landing, taxiing, etc. However, the example methods and apparatus to cool a heat source disclosed herein may be used in other missions, which may, for example, have other numbers of stages (e.g., 1, 2, 4, 5, etc.), involve performing additional and/or different actions, etc.

During the example mission, the heat source 302 may be in a state or mode such as, for example, a pre-operational mode, a standby mode, an operational mode, a post-operational mode, and/or other modes. In some examples, the heat source 302 is cooled based on the mode of the heat source 302, an amount of fuel remaining in the aircraft 100, an action being performed and/or the stage of the mission.

During the first stage of the mission, the heat source 302 may be in and/or enter the pre-operational mode and/or the standby mode. In some examples, the heat source 302 is in the pre-operational mode prior to being cooled below the threshold temperature via the heat source thermal management system 300. For example, the heat source 302 may be in the pre-operational mode prior to flight. In some examples, the heat source 302 is in the pre-operational mode until the cold tank 204 is substantially emptied and refilled with cold fuel. In some examples, the heat source 302 is in the standby mode when the heat source 302 is within the operational temperature range and the heat source 302 is not being operated.

In some examples, the fuel utilized to cool the heat source 302 bypasses the cold tank 204 via the first bypass 318 when the heat source 302 is in the pre-operational mode. For example, when the heat source 302 is in the pre-operational mode, the heat source 302 is cooled from above the threshold temperature to within the operational temperature range by circulating fuel from the hot tank 202 to the fuel cooling system 308, from the fuel cooling system 308 to the heat source cooling system 312 via the first bypass 318, and from the heat source cooling system 312 to the hot tank 202. In some examples, the fuel is pumped from the hot tank 202 via the first pump 310 through the fuel cooling system 308 at a first flow rate when the heat source 302 is in the pre-operational mode. The first flow rate may be, for example, 39.2 pounds per minute. In other examples, the first flow rate is other values.

In some examples, the heat source 302 is heated during the pre-operational mode. For example, if the heat source 302 is at a temperature below the operational temperature range and the temperature of the fuel in the hot tank 202 is within or above the operational temperature range, the heat source 302 may be heated by pumping the fuel from the hot tank 202 to the heat source cooling system 312 via, for example, the second fuel flow path 306. Thus, in some examples, the heat source thermal management system 300 may be used to heat the heat source 302.

When the temperature of the heat source 302 is within the desired temperature range and the heat source 302 is not being operated, the heat source 302 is in the standby mode. In some examples, while the heat source 302 is in the standby mode, the temperature of the heat source 302 is maintained within the desired temperature range by flowing cooled fuel at a second flow rate through the heat source cooling system 312. In some examples, the second flow rate is 23.8 pounds per minute. In other examples, the second flow rate is other values. The cooled fuel may be flowed to the heat source cooling system 312 from the hot tank 202 via the first bypass 318 and/or from the cold tank 204. In some examples, the temperature of the heat source 302 in the standby mode is maintained within the desired temperature range by periodically flowing cooled fuel through the heat source cooling system 312. In some examples, the heat source 302 is not cooled via the fuel when the heat source 302 is in the standby mode. For example, the heat source 302 may not be cooled via the fuel if the heat source 302 does not generate heat when the heat source 302 is in the standby mode.

During the first stage of the mission, the cold tank 204 and the hot tank 202 may be substantially filled with fuel. In some examples, during the first stage of the mission, the fuel stored in the cold tank 204 is supplied to the first engine 108 and/or the second engine 110 while the fuel in the hot tank 202 is used to cool the heat source 302. For example, while the heat source 302 is being cooled by circulating fuel between the hot tank 202 and the heat source cooling system 312 via the first bypass 318, fuel from the cold tank 204 is supplied to the first engine 108 and/or the second engine 110 via the second bypass 324. In some examples, fuel from the cold tank 204 is supplied to the first engine 108 and/or the second engine 110 until the cold tank 204 is substantially empty. In some examples, fuel from the hot tank 202 is used to cool the heat source 302 and/or supply the first engine 108 and/or the second engine 110 during the first stage of the mission. For example, the fuel from the hot tank 202 may be directed via the third bypass 330 to the first engine 108 and/or the second engine 110 and/or the fuel from the hot tank 202 may be flowed into the cold tank 204.

The second stage of the mission may initiate and/or occur after the cold tank 204 has been substantially emptied to supply the first engine 108 and/or the second engine 110 with fuel. During the second stage of the mission, the heat source 302 may be in the operational mode or the standby mode. In some examples, when the heat source 302 is in the operational mode, the heat source 302 is being operated and generates heat. In some examples, the heat source 302 is in the operational mode for a given amount of time ("an operating time") and then returns to the standby mode. Thus, the heat source 302 may periodically operate during the second stage.

During the second stage of the mission, the fuel from the hot tank 202 is cooled and stored in the cold tank 204. To maintain the heat source 302 within the operational temperature range while the heat source 302 is operating, the cooled fuel is flowed from the cold tank 204 through the heat source cooling system 312 at a third flow rate greater than the first flow rate and the second flow rate. For example, the third flow rate may be approximately 1300 pounds per minute. However, this is merely an example and, thus, the third flow rate may be other values in other examples.

In some examples, the cold tank 204 is at least partially filled with the cooled fuel prior to operating the heat source 302. For example, fuel from the hot tank 202 is flowed through the fuel cooling system 308 and into the cold tank 204. In some examples, the cooled fuel is flowed into the cold tank 204 at a fourth flow rate and stored in the cold tank 204 until the heat source 302 is operated. In some examples, the fourth flow rate is based on a cooling capacity of the fuel cooling system 308 and/or the first temperature of the fuel stored in the hot tank 202 to enable the fuel to be cooled to the second temperature within a desired amount of time. In some examples, the fourth flow rate is about 80 pounds per minute. In other examples, the fourth flow rate is other values. In some examples, an amount of fuel stored in the cold tank 204 is substantially equal to or greater than an amount of fuel to be flowed through the heat source cooling system 312 to cool the heat source 302 while the heat source 302 is operating. When the heat source 302 is operated, the cooled fuel is pumped via the second pump 316 through the heat source cooling system 312 at the third flow rate to absorb at least some of the heat generated by the heat source 302 to maintain the heat source 302 below the threshold temperature and/or within the desired temperature range. As the cooled fuel flows through the heat source cooling system 312, the cooled fuel functions as a heat sink and absorbs heat generated by the heat source 302. The cooled fuel then flows from heat source cooling system 312 into the hot tank 202.

In some examples, while the cooled fuel is being pumped out of the cold tank 204 to cool the heat source 302, cooled fuel is also pumped into the cold tank 204 from the hot tank 202 at a fifth flow rate such as, for example, 200 pounds per minute to replenish the cold tank 204. In other examples, the cold tank 204 is substantially emptied to cool the heat source 302 over the operating time. The cold tank 204 may then be at least partially refilled or replenished with cooled fuel by flowing fuel from the hot tank 202 to the cold tank 204 via the fuel cooling system 308. In some examples, the cooled fuel is stored in the cold tank 204 until the heat source 302 is operated. In this manner, the temperature of the heat source 302 may be maintained with the desired temperature range while the heat source 302 is operated one or more times during the second stage of the mission.

In some examples, during the third stage of the mission, the heat source 302 is in the post-operational mode. In some examples, the heat source enters the pre-operational mode and/or the third stage of the mission begins when an amount of fuel remaining in the aircraft 100 is at or below a threshold amount. In some examples, the threshold amount is sixteen percent of a total fuel capacity of the aircraft 100. In other examples, the threshold amount corresponds to other percentages of the total fuel capacity of the aircraft 100. In some examples, when the heat source 302 is in the post-operational mode, the fuel in the hot tank 202 and/or the cold tank 204 is supplied to the first engine 108 and/or the second engine 110. Thus, fuel may be flowed into the first feed tank 230 and/or the second feed tank 220 via the second split and/or the third split. In some examples, the heat source 302 is cooled by the heat source thermal management system 300 when the heat source 302 is in the post-operational mode. In other examples, the heat source 302 is not cooled via the fuel when the heat source 302 is in the post-operational mode.

During the post-operational mode, cooled fuel may be used to cool the heat source(s) 336, 340 via the first heat exchanging system 338 and the second heat exchanging system 342. In some examples, the cooled fuel sufficiently cools the heat sources(s) 336, 340 in a single pass For example, the cooled fuel may sufficiently cool the heat source(s) 336, 340 without being re-circulated through the first heat exchanging system 338 and/or the second heat exchanging system 342 and, thus, without being reheated. As a result, an undesirable increase in the temperature of the fuel or a repeated cycle in which an increase in temperature of the fuel leads to a further increase in temperature of the fuel is substantially prevented and less fuel may be used to cool the heat source(s) 336, 340 than if fuel at the first temperature is employed to cool the heat source(s) 336, 340. Once the cooled fuel flows through the first heat exchanging system 338 and/or the second heat exchanging system 342, the fuel is fed to the first engine 108 and/or the second engine 110. As a result, the example aircraft 100 may conduct the example mission according to a schedule in which approximately 95 percent of the total fuel capacity of the aircraft 100 is used during the mission. For example, the aircraft 100 may land following the mission with approximately 5 percent of the total fuel capacity of the aircraft 100 remaining. In other examples, the aircraft 100 may use and/or land with other amounts of fuel.

As discussed above, the flow rate at which the fuel is flowed through the heat source thermal management system 300 via the first pump 310 may be controlled based on an amount of heat generated by the heat source 302 and/or the operational mode of the heat source 302. For example, when the heat source 302 is in the pre-operational mode, the first pump 310 flows the fuel through the fuel cooling system 308 at the first flow rate. When the heat source 302 is in the standby mode, the first pump 310 may flow the fuel through the fuel cooling system 308 and the first bypass 318 at a second flow rate to cool the heat source 302. In some examples, when the heat source is in the standby mode, the first pump 310 flows the fuel at the fourth flow rate to fill or replenish at least a portion of the cold tank 204 with cooled fuel. When the heat source 302 is in the operating mode, the first pump 310 may flow the fuel at the fourth flow rate to supply the cold tank 204 with cooled fuel while the second pump 316 is flowing cooled fuel through the heat source cooling system 312 at the third flow rate.

In the illustrated example, the flow rate at which the second pump 316 flows fuel from the cold tank 204 is also based on the amount of heat generated by the heat source 302 and/or operational mode of the heat source 302. For example, when the heat source 302 is in the pre-operational mode, the second pump 316 flows fuel at a sixth flow rate to the first feed tank 230 and/or the second feed tank 220 to supply the first engine 108 and/or the second engine 110 with fuel. In some examples, when the heat source 302 is in the standby mode, the second pump 316 flows fuel through the heat source cooling system 312 at the second flow rate. When the heat source 302 is in the operational mode, the second pump 316 flows the cooled fuel through the heat source cooling system 312 at the third flow rate.

In some examples, the first flow rate, the second flow rate, the third flow rate, the fourth flow rate, the fifth flow rate, and/or the six flow rate are adjusted, changed, modulated, varied, and/or fluctuated based on the amount of heat generated by the heat source 302. For example, if the heat generated by the heat source 302 increases while the heat source 302 is operating, the second flow rate may be increased to maintain the temperature of the heat source 302 within the operational range.

The flow rates and a cooling capacity of the fuel cooling system 308 enable a given amount of the fuel to be cooled from a first temperature to a second temperature in a given amount time. The cooling capacity of the fuel cooling system 308 is an amount of heat energy the fuel cooling system 308 can remove from the fuel. For example, the fuel cooling system 308 may cool 2,613 pounds of fuel from about 120 degrees Fahrenheit to about 30 degrees Fahrenheit in approximately thirty minutes. The flow rates and the cooling capacity of the heat source cooling system 312 enable the heat source 302 to be cooled below the threshold temperature and/or maintain the temperature of the heat source 302 within the operational temperature range. The cooling capacity of the heat source cooling system 312 is an amount of heat energy the heat source cooling system 312 can absorb from the heat source 302 via the cooled fuel. In some examples, the heat source 302 is selectively and/or periodically operated and/or cooled. In other examples, the heat source 302 is substantially continuously operated and/or cooled. Thus, the flow rates and the cooling capacities of the fuel cooling system 308 and/or the heat source cooling system 312 employed in the heat source thermal management system 300 may be based on an amount of heat generated by the heat source 302, an operational temperature range of the heat source 302, an operating time of the heat source 302, a frequency of operation of the heat source 302, an amount of space available on a vehicle employing the temperature management system 300 to employ one or more heat exchangers, an amount of fuel available for use in the heat source thermal management system 300, etc.

While an example manner of implementing the heat source thermal management system 300 is illustrated in FIG. 3, one or more of the elements, processes and/or devices illustrated in FIG. 3 may be combined, divided, re-arranged, omitted, eliminated and/or implemented in any other way. The example heat source thermal management system 300 of FIG. 3 may include one or more elements, processes and/or devices in addition to, or instead of, those illustrated in FIG. 3, and/or may include more than one of any or all of the illustrated elements, processes and devices.

FIG. 4 is a block diagram illustrating the example fuel flow controller 400 disclosed herein, which may be used to control the flow of the fuel in the aircraft 100. In the illustrated example, the fuel flow controller 400 is in communication with the first pump 310 of the hot tank 202, a hot tank temperature sensor 402, a hot tank fuel level sensor 404, a cold tank temperature sensor 406, a cold tank fuel level sensor 408, the second pump 316, the first valve 322, the second valve 328, the third valve 334 and one or more vehicle fuel level sensor(s) 410. In the illustrated example, the hot tank temperature sensor 402 is disposed inside the hot tank 202, and the cold tank temperature sensor 406 is disposed inside the cold tank 204. In other examples, the hot tank temperature sensor 402 and/or the cold tank temperature sensor 406 are disposed in other locations within the heat source thermal management system 300. For example, the hot tank temperature sensor 402 may be disposed along the second fuel path 306 (FIG. 3) downstream of the heat source cooling system 312. In some examples, the cold tank temperature sensor 406 is disposed along the first fuel path 304 (FIG. 3) downstream of the fuel cooling system 308.

In some examples, the fuel flow controller 400 controls the fuel flow into and/or out of the hot tank 202 to cool and/or heat the heat source 302 and/or supply the first engine 108 (FIG. 1) and/or the second engine 110 (FIG. 1) with fuel based on a temperature of the hot tank 202, a temperature of the fuel in the hot tank 202, a temperature of the cold tank 204, a temperature of the fuel in the cold tank 204, a level of fuel in the hot tank 202 (e.g., an amount of fuel remaining in the hot tank 202 and/or an amount of space available to receive fuel), a level of fuel in the cold tank 204, a temperature and/or an amount of heat generated by the heat source 302, a mode of operation of the heat source 302 and/or other information. In some examples, the fuel flow controller 400 monitors a temperature of the hot tank 202 and/or the temperature of the fuel in the hot tank 202 based on temperature information acquired via the hot tank temperature sensor 402. The example fuel flow controller 400 of FIG. 4 may also monitor the level of fuel in the hot tank 202 based on information acquired via the hot tank fuel level sensor 404.

In some examples, the fuel flow controller 400 controls the fuel flow into and/or out of the cold tank 204 to cool the heat source 302 and/or supply the first engine 108 and/or the second engine 110 with fuel based on the temperature of the hot tank 202, the temperature of the fuel in the hot tank 202, the temperature of the cold tank 204, the temperature of the fuel in the cold tank 204, the level of fuel in the hot tank 202, the level of fuel in the cold tank 204, the temperature and/or amount of heat generated by the heat source 302, the mode of operation of the heat source 302 and/or other information. In some examples, the fuel flow controller 400 monitors the temperature of the cold tank 204 and/or the temperature of the fuel in the cold tank 204 based on temperature information acquired via the cold tank temperature sensor 406. The example fuel flow controller 400 of FIG. 4 may also monitor the level of fuel level in the cold tank 204 by, for example, determining an amount of fuel remaining in the cold tank 204 and/or an amount of space available to receive fuel in the cold tank 204 based on information acquired via the cold tank fuel level sensor 408.

For example, if the flow controller 400 determines that the level of fuel in the cold tank 204 is below a first predetermined level, the flow controller 400 may pump fuel from the hot tank 202 to the cold tank 204 via the first pump 310 to substantially fill the cold tank 204. Then, if the temperature of the heat source 302 is above a threshold temperature, the flow controller 400 may pump fuel from the cold tank 204 through the heat source cooling system 312 to cool the heat source 302 and into hot tank 202.

If the example flow controller 400 determines that the level of fuel in the cold tank 204 is above the first predetermined level and the level of fuel in the hot tank 202 is above a second predetermined level, the flow controller 400 may supply the first engine 108 and/or the second engine 110 with fuel from the cold tank 204 and/or the hot tank 202 until the level of fuel in the cold tank 204 and/or the hot tank 202 is below the first predetermined level and/or the second predetermined level, respectively. Once the level of fuel in the cold tank 204 and/or the hot tank 202 is below the first predetermined level and/or the second predetermined level, respectively, the flow controller 400 may circulate the fuel between the hot tank 202 and the cold tank 204 to cool the heat source 302.

In some examples, the flow controller 400 controls different and/or additional devices such as, for example, variable flow pumps, variable position valves, or other devices. In some examples, the flow controller 400 employs proportional, integral and/or derivative gain terms. In some examples, the flow controller employs table lookup and/or anticipatory control schemes to implement the example heat source thermal management system 300.

While an example manner of implementing the example heat source thermal management system 300 of FIG. 3 is illustrated in FIG. 4, one or more of the elements, processes and/or devices illustrated in FIG. 4 may be combined, divided, re-arranged, omitted, eliminated and/or implemented in any other way. Further, the example vehicle fuel level sensor(s) 410, the example first bypass 318, the example second bypass 324, the example third bypass 330, the example heat source 302, the example first pump 310, the example hot tank temperature sensor 402, the example hot tank fuel level sensor 404, the example cold tank temperature sensor 406, the example cold tank fuel level sensor 408, the example second pump 316, the example fuel flow controller 400 and/or, more generally, the example heat source thermal management system 300 of FIG. 4 may be implemented by hardware, software, firmware and/or any combination of hardware, software and/or firmware. Thus, for example, any of the example vehicle fuel level sensor(s) 410, the example first bypass 318, the example second bypass 324, the example third bypass 330, the example heat source 302, the example first pump 310, the example hot tank temperature sensor 402, the example hot tank fuel level sensor 404, the example cold tank temperature sensor 406, the example cold tank fuel level sensor 408, the example second pump 316, the example fuel flow controller 400 and/or, more generally, the example heat source thermal management system 300 of FIG. 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, vehicle fuel level sensor(s) 410, the example first bypass 318, the example second bypass 324, the example third bypass 330, the example heat source 302, the example first pump 310, the example hot tank temperature sensor 402, the example hot tank fuel level sensor 404, the example cold tank temperature sensor 406, the example cold tank fuel level sensor 408, the example second pump 316, the example fuel flow controller 400 and/or, more generally, the example heat source thermal management system 300 of FIG. 4 is/are hereby expressly defined to include a tangible computer readable storage device or storage disk such as a memory, a digital versatile disk (DVD), a compact disc (CD), a Blu-ray disk, etc. storing the software and/or firmware. Further still, the example heat source thermal management system 300 of FIG. 3 may include one or more elements, processes and/or devices in addition to, or instead of, those illustrated in FIG. 4, and/or may include more than one of any or all of the illustrated elements, processes and devices.

Flowcharts representative of example methods that may be used to implement the heat source thermal management system 300 of FIG. 3 are shown in FIGS. 5-9. The methods may be implemented using machine readable instructions that comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 5-9, many other methods of implementing the example heat source temperature management system 300 may alternatively be used. For example, the order of execution of the blocks may be changed, a start and/or an end of each of the methods 500, 600, 800 may occur prior to and/or after different blocks and/or some of the blocks described may be changed, eliminated, or combined.

As mentioned above, the example methods of FIGS. 5-9 may be implemented using coded instructions (e.g., computer and/or machine readable instructions) stored on a tangible computer readable storage medium such as a hard disk drive, a flash memory, a read-only memory (ROM), a compact disc (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example methods of FIGS. 5-9 may be implemented using coded instructions (e.g., computer and/or machine readable instructions) stored on a non-transitory computer and/or machine readable medium such as a hard disk drive, a flash memory, a read-only memory, a compact disc (CD), a digital versatile disk (DVD), a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

Figure 5:
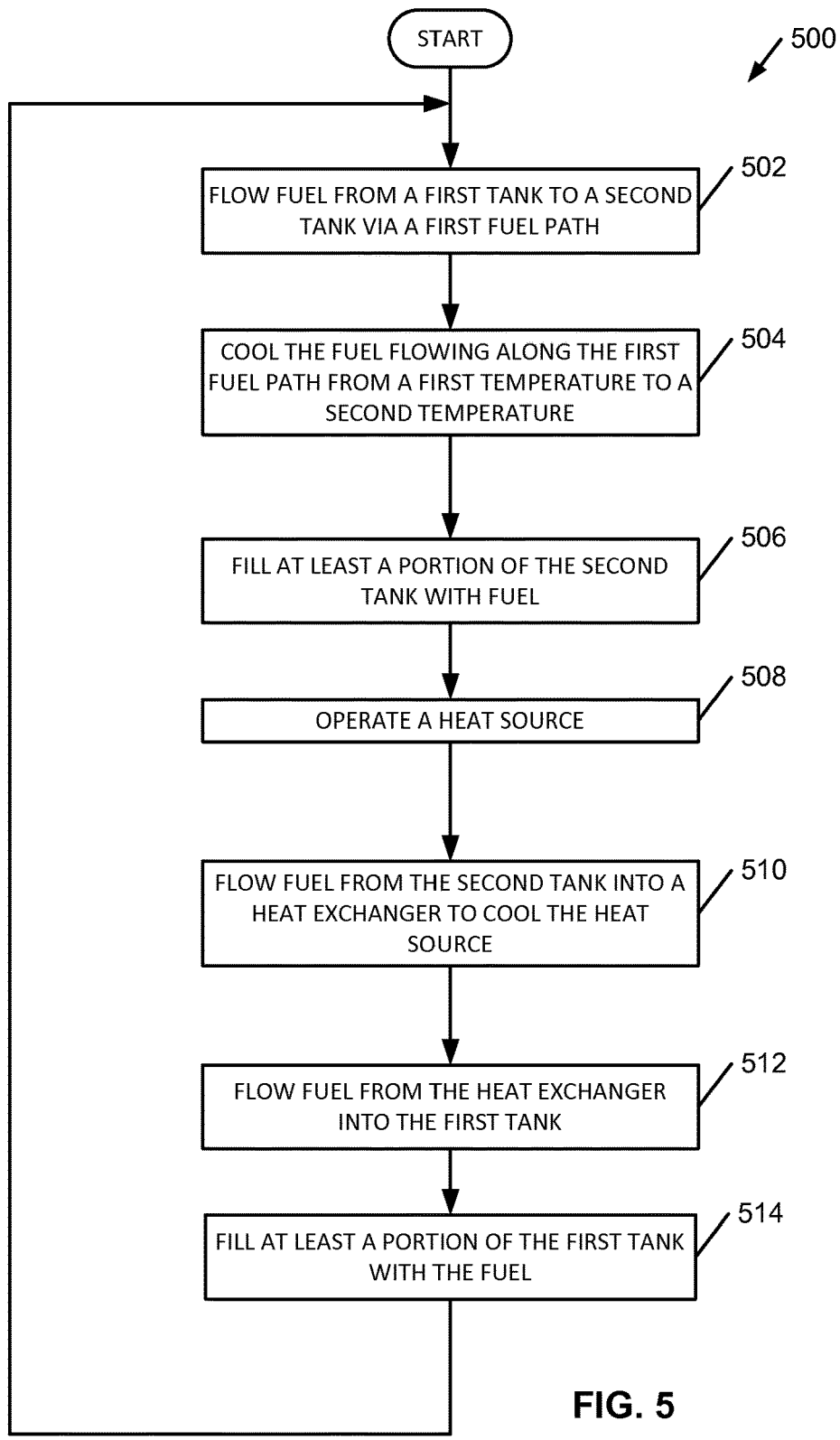
FIG. 5 is a flowchart representative of an example method to cool a vehicle heat source.

The example method 500 of FIG. 5 may be used to cool one or more heat sources on a vehicle such as, for example, the heat source 302. The example method 500 of FIG. 5 begins at block 502 by flowing fuel from a first tank to a second tank via a first fuel path. For example, fuel may be flowed from the hot tank 202 to the cold tank 204 via the first fuel path 304. The fuel is cooled from a first temperature to a second temperature along the first fuel path (block 504). For example, the fuel is flowed through a heat exchanger of the fuel cooling system 308 disposed along the first fuel path 304. The fuel may be flowed through any type of heat exchanger such as, for example, an air-to-fuel heat exchanger, a refrigerant-to-fuel heat exchanger, etc. At block 506, at least a portion of the second tank is filled with the fuel. In some examples, the second tank includes the thermal insulation such as, for example, the thermal insulation 212 to reduce and/or minimize an amount of heat energy absorbed by the fuel while the fuel is stored in the second tank.

At block 508, a heat source is operated. For example, a weapon system may be activated, a radar system may be activated, and/or any other heat source(s) may be operated. When the heat source is operated, the heat source generates heat. At block 510, fuel is flowed from the second tank into a heat exchanger to cool the heat source. The heat exchanger may be any type of heat exchanger such as, for example, a water-to-fuel heat exchanger of the heat source cooling system 312 of FIG. 3. At block 512, the fuel is flowed from the heat exchanger to the first tank. Thus, the fuel is circulated between the first tank and the second tank to cool the heat source. In some examples, the fuel from the second tank is substantially emptied into the first tank. At block 514, at least a portion of the first tank is filled with the fuel. The example method 500 of FIG. 5 then returns to block 502 to enable the heat source to be periodically and/or substantially continuously cooled.

Figure 6:
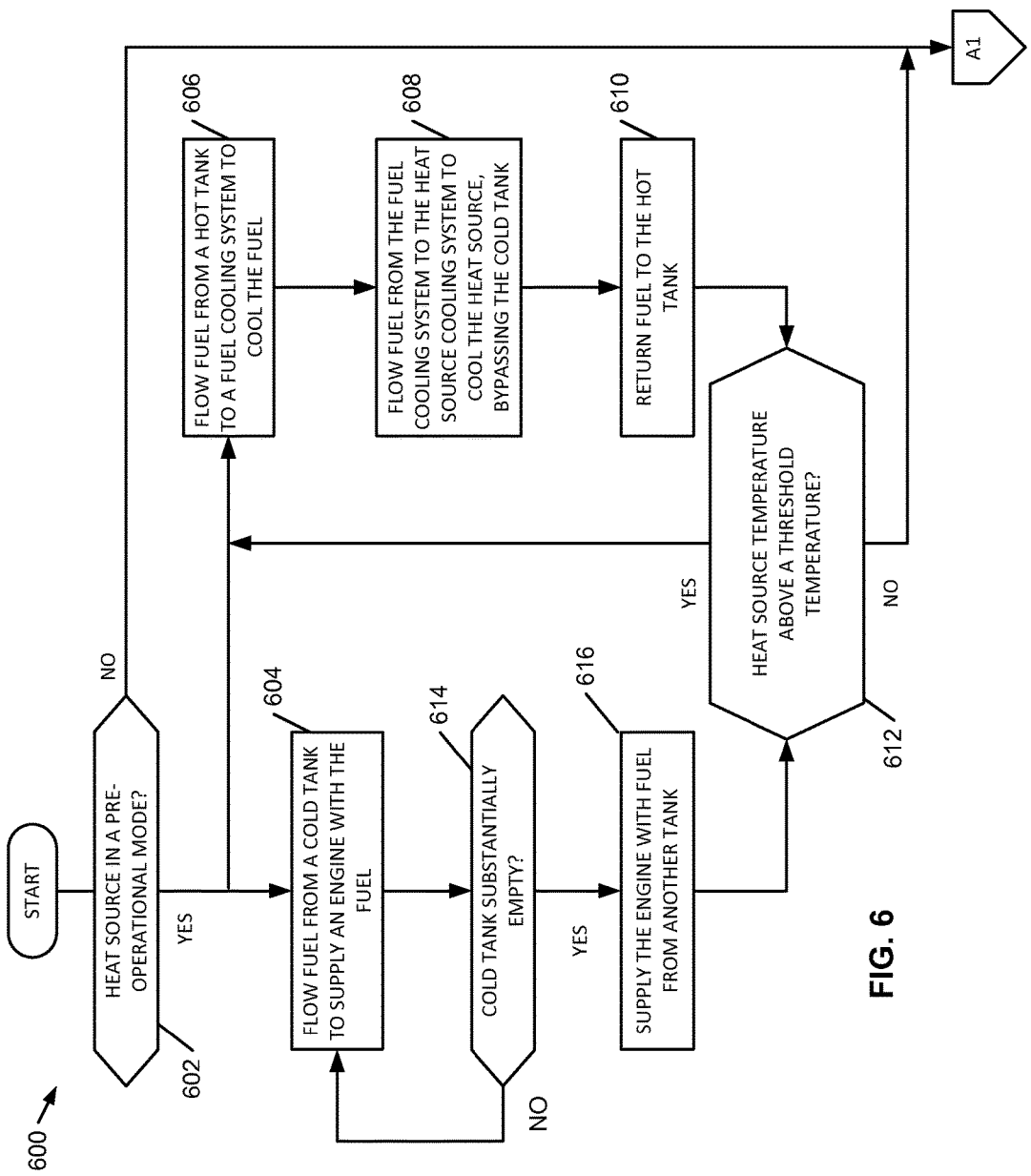
FIG. 6 is a flowchart representative of another example method to cool a vehicle heat source.
Figure 7:
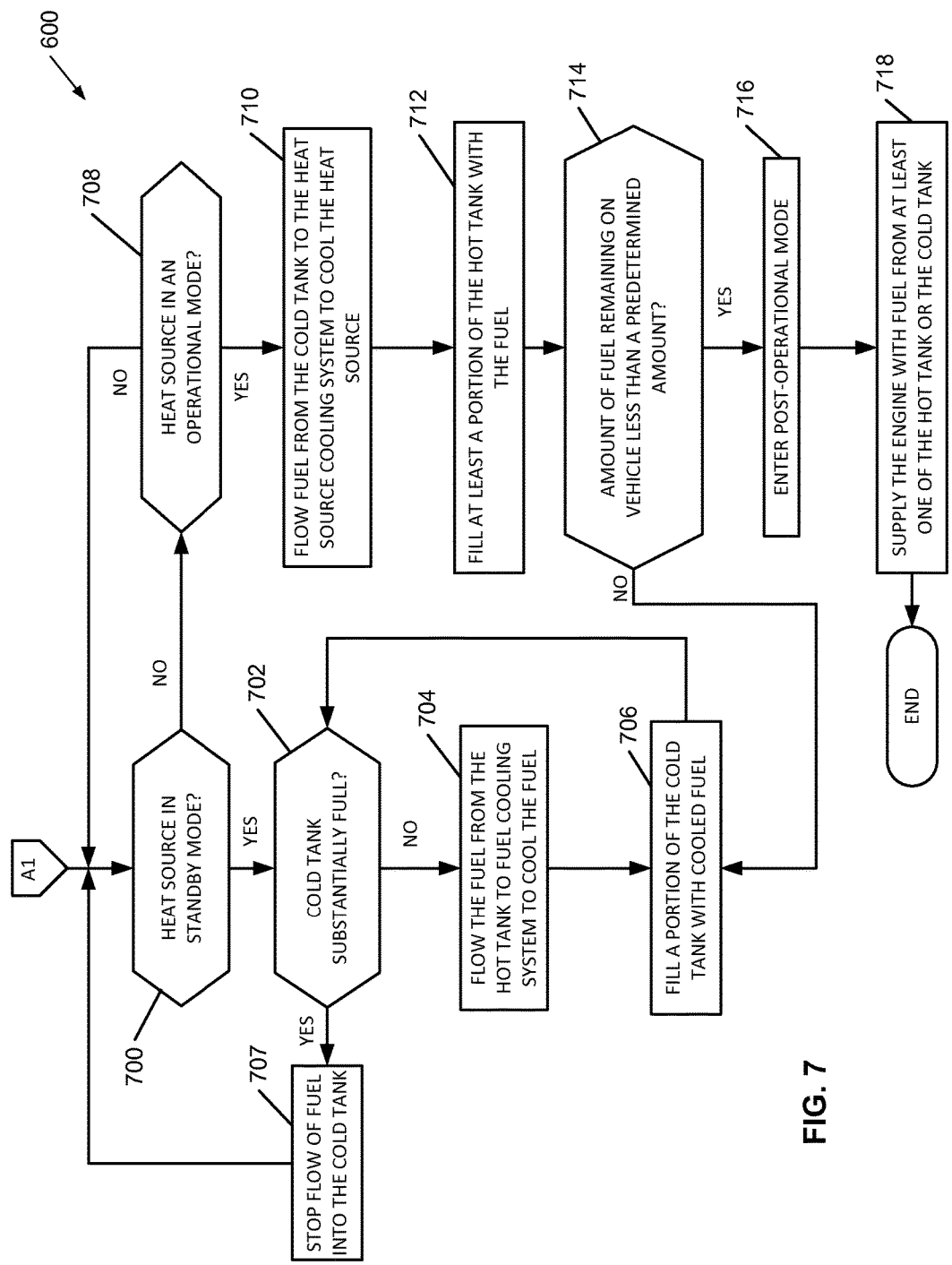
FIG. 7 is a continuation of the flowchart of FIG. 6, according to another example method to cool a vehicle heat source.

FIG. 6 is a flowchart representative of another example method 600 disclosed herein. The example method 600 of FIGS. 6-7 is used to cool the example heat source 302 of FIG. 3 during a mission having three stages. However, the example method 600 of FIGS. 6-7 may be used to cool any other heat source on any vehicle. Also, while the example method 600 of FIGS. 6-7 involves a mission having three stages, other examples cool one or more heat sources during missions having other numbers of stages (e.g., 1, 2, 4, 5, etc.). In the illustrated example, the aircraft 100 is substantially fully fueled during an initial portion of the first stage of the mission. For example, the tanks 202, 204, 214, 216, 218, 220, 222, 224, 226, 228, 230, 232 and 234 may be substantially filled with fuel at an outset of the mission. In other examples, the aircraft 100 initially has other amounts of fuel. For example, the aircraft 100 may be filled with an amount of fuel corresponding to, for example, half, two-thirds, three-quarters, etc. of a total fuel capacity of the aircraft 100. As the mission is carried out, the first engine 108 and the second engine 110 are supplied with the fuel, thereby decreasing an amount of fuel remaining on the aircraft 100. In the example method 600 of FIGS. 6-7, the heat source 302 is cooled based on a mode of operation of the heat source 302 and/or an amount of fuel remaining in the aircraft 100 during the mission.

The example method 600 of FIG. 6 begins by determining if the heat source 302 is in the pre-operational mode (block 602). In some examples, the heat source 302 is in the pre-operational mode if a temperature of the heat source 302 is above a threshold temperature and/or outside of an operational temperature range. In some examples, the heat source 302 is above the threshold temperature during a portion of the mission. For example, the heat source 302 may be above the threshold temperature during a first stage of the mission. In other examples, the heat source 302 is at or below the threshold temperature throughout the mission and, thus, does not enter the pre-operational mode. For example, the heat source 302 may be in the standby mode or the operational mode at the outset of the mission. In some examples, the heat source 302 is in the pre-operational mode if hot tank 202 and the cold tank 204 are substantially filled with fuel.

In some examples, the fuel in the cold tank 204 is supplied to the first engine 108 and/or the second engine 110 during a first stage of a mission when the hot tank 202 and the cold tank 204 are substantially filled with fuel to provide space in the cold tank 204 to receive cooled fuel. Thus, in the illustrated example, if it is determined that the heat source 302 is in a pre-operational mode at block 602, fuel is flowed from the cold tank 204 to supply an engine with the fuel (block 604). In some examples, fuel is not flowed from the cold tank 204 and/or the hot tank 202 to supply an engine such as, for example, the first engine 108 and/or the second engine 110 with fuel during the first stage of the mission, the second stage of the mission, and/or the third stage of the mission.

In the illustrated example, if the heat source 302 is in the pre-operational mode, fuel is also flowed from the hot tank 202 to the fuel cooling system 308 to cool the fuel (block 606). The fuel cooling system 308 cools the fuel from the first temperature to the second temperature less than the first temperature. For example, the fuel cooling system 308 may cool the fuel from 120 degrees Fahrenheit to 30 degrees Fahrenheit. The fuel is flowed from the fuel cooling system 308 to the heat source cooling system 312, bypassing the cold tank 204, to cool the heat source 302 (block 608). The fuel is returned to the hot tank 202 (block 610). If the heat source temperature is above a threshold temperature (block 612), the example method 600 returns to block 606. In some example, the heat source 302 is below the threshold temperature during the first stage of the mission and, therefore, is not cooled via the fuel until the heat source 302 is operated and/or generates heat. If the heat source temperature is below the threshold temperature (block 612), the heat source 302 may be in a standby mode or an operational mode and, thus, the example method 600 proceeds to block 700, which is discussed in greater detail below.

As discussed above in conjunction with block 604, if the heat source 302 is in the pre-operational mode, the fuel is flowed from the cold tank 204 to supply the engine with the fuel. In the illustrated example, the cold tank 204 is substantially emptied during the first stage of the mission. If it is determined that the cold tank 204 is substantially empty (block 614), fuel is supplied to the engine from another tank (block 616), and the example method 600 proceeds to block 612. For example, the fuel may be supplied by one or more of the tanks 214, 216, 218, 220, 222, 224, 226, 228, 230, 232 and 234 of FIG. 2. In other examples, the cold tank 204 is not substantially emptied during the first stage of the mission.

If the heat source 302 is not in the pre-operational mode (block 602) or if the heat source temperature is below the threshold temperature (block 612), it is determined if the heat source 302 is in standby mode (block 700) (FIG. 7). In some examples, the heat source 302 is in the standby mode if the heat source 302 is below the threshold temperature and/or within the operational temperature range and the heat source 302 is not operating. In some examples, the heat source 302 enters the standby mode when the example cold tank 204 is substantially empty.

Referring to FIG. 7, if the heat source 302 is in the standby mode, it is determined if the cold tank 204 is substantially full (block 702). If the cold tank 204 is not substantially full, fuel is flowed from the hot tank 202 to the fuel cooling system 308 to cool the fuel (block 704). In some examples, the first pump 310 pumps the fuel from the hot tank 202 at the fourth flow rate. At block 706, a portion of the cold tank 204 is filled with the cooled fuel. The example method 600 then returns to block 702 and it is determined if the cold tank 204 is substantially full. If the cold tank 204 is substantially full, the flow of fuel into the cold tank 204 is stopped (block 707), and the example method 600 returns to block 700. Thus, in the illustrated example, the cold tank 204 is substantially filled with cooled fuel while the heat source 302 is in the standby mode. In some examples, a portion of the fuel in the cold tank 204 is flowed from the cold tank 204 to cool the heat source 302 when the heat source 302 is in the standby mode. In other examples, the heat source 302 is not cooled via the cooled fuel when the heat source 302 is in the standby mode.

If the heat source 302 is not in the standby mode, it is determined if the heat source 302 is in an operational mode (block 708). In the illustrated example, the heat source 302 enters the operational mode during the second stage of the mission. In some examples, the heat source 302 may be in the operational mode during the second stage and/or other stages of the mission. For example, the heat source 302 may be in the operational mode substantially throughout the mission, during the first stage and/or the third stage, etc. In some examples, the heat source 302 in the operational mode is being selectively operated and generates heat.

If the heat source 302 is in the operational mode, the fuel in the cold tank 204 is flowed to the heat source cooling system 312 to cool the heat source 302 (block 710). In some examples, the second pump 316 pumps the fuel at the third flow rate such as, for example, 1370 pounds per minute. In some examples, a flow rate of the cooled fuel pumped by the second pump 316 varies based on amount of heat generated by the heat source 302 while the heat source 302 is in the operational mode. The cooled fuel passes through the heat source cooling system 312 and into the hot tank 202. At block 712, the hot tank 202 is at least partially filled with the fuel In the illustrated example, the heat source 302 is cooled based on the amount of fuel remaining in the aircraft 100 during the mission. At block 714, it is determined if an amount of fuel remaining on the aircraft 100 is less than a predetermined amount. If the amount of fuel remaining is above the predetermined amount, the example method 700 returns to block 706, and at least a portion of the cold tank 204 is filled with cooled fuel. In this manner, the heat source 302 may be periodically and/or substantially continuously cooled via the cooled fuel.

If the amount of fuel remaining is less than the predetermined amount, the heat source 302 enters a post-operational mode (block 716). In other examples, the heat source 302 enters the post-operational mode based on other prompts, factors and/or conditions such as, for example, a depletion of weaponry, entering a different stage of the mission, a user command, etc. In the illustrated example, if the heat source 302 is in the post-operational mode, the engine is supplied with fuel from at least one of the hot tank 202 or the cold tank 204 (block 718). In some examples, fuel is flowed from the cold tank 204 to the first engine 108 via the second bypass 324 and/or fuel is flowed from the hot tank 202 to the second engine 110 via the third bypass 330. In some examples, the fuel is used to cool one or more components and/or fluids such as, for example, hydraulic fluid, oil, etc. on the aircraft 100 as the fuel is directed from the heat source thermal management system 300 to the first engine 108 and/or the second engine 110. For example, the fuel may be used to cool the one or more components via the first heat exchanging system 338 and/or the second heat exchanging system 342 of FIG. 3.

Figure 8:
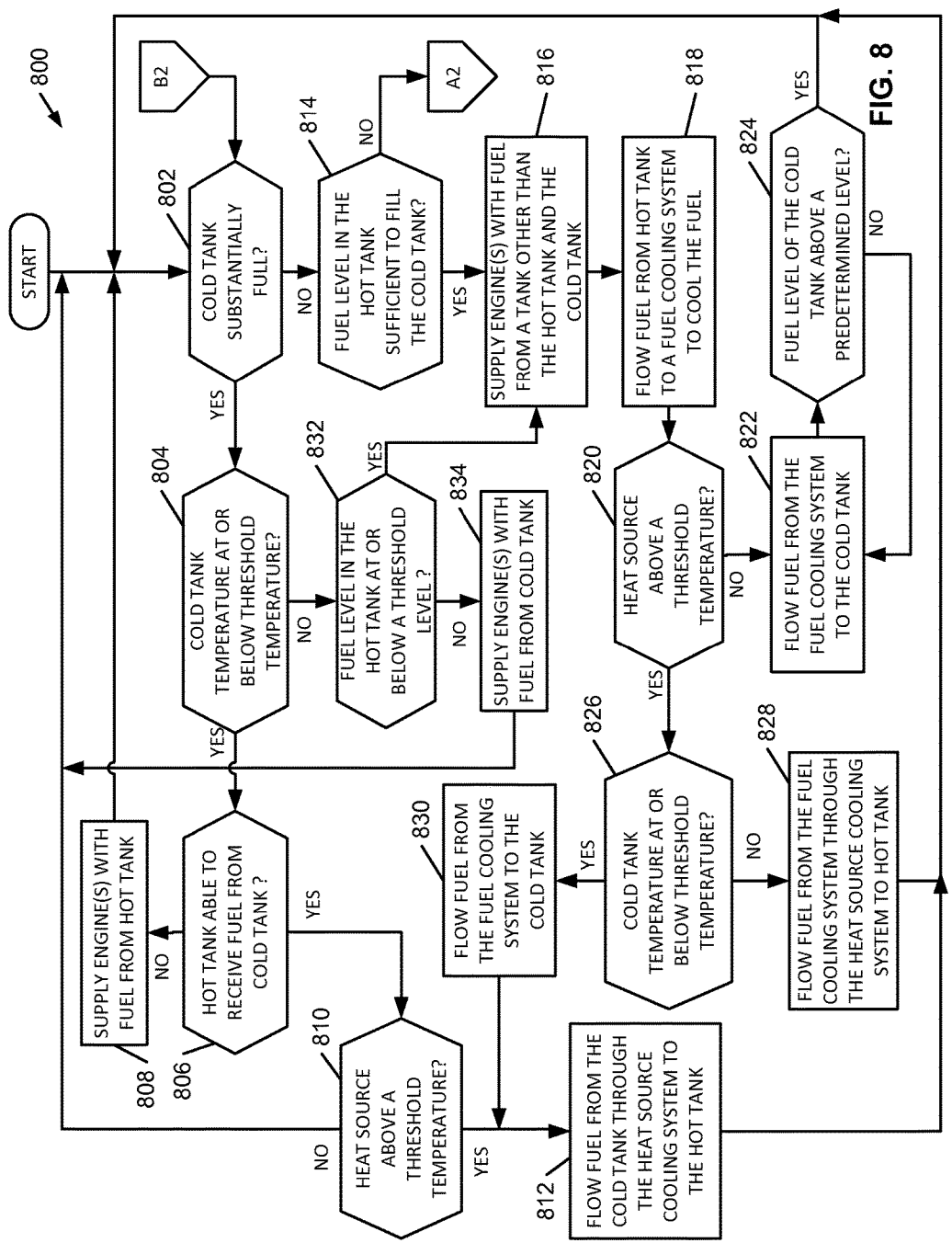
FIG. 8 is a flowchart representative of another example method disclosed herein.
Figure 9:
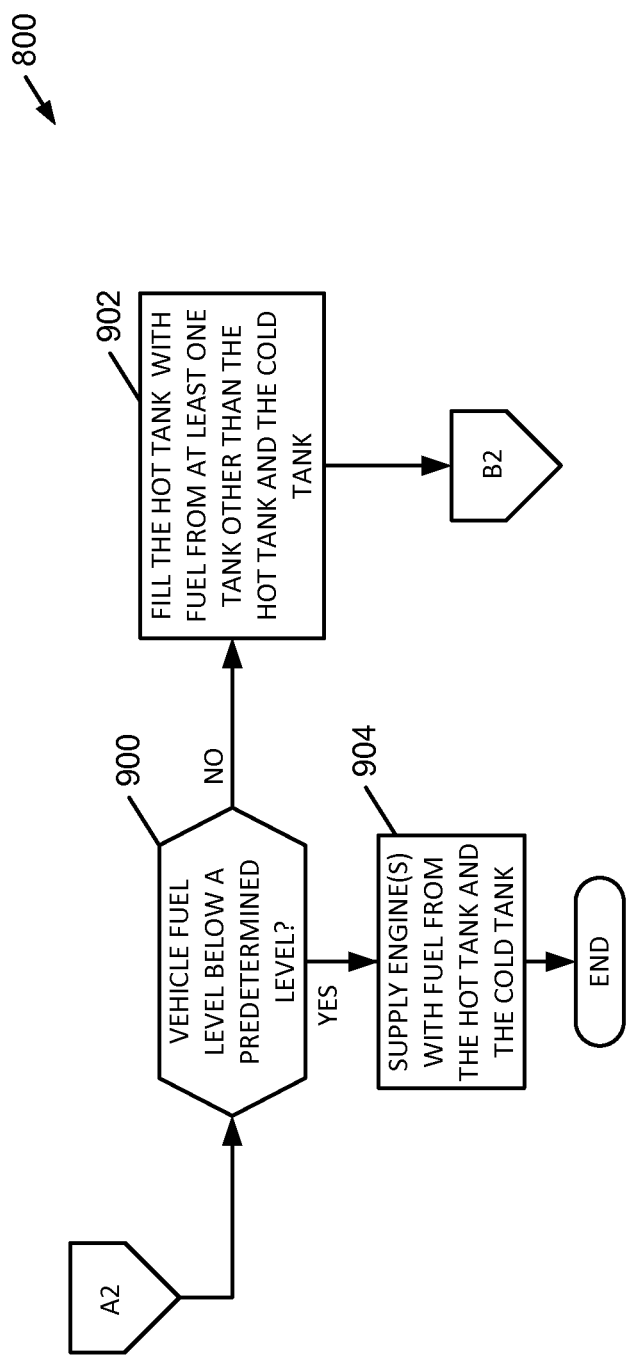
FIG. 9 is a continuation of the flowchart of FIG. 8.

FIGS. 8-9 illustrate a flowchart representative of another example method 800 disclosed herein. The example method 800 of FIGS. 8-9 may be used to cool the example heat source 302 of FIG. 3 and/or any other vehicle heat source. The example method 800 begins by the flow controller 400 determining if the cold tank 204 is substantially full (block 802). In other examples, the flow controller 400 determines if the fuel in the cold tank 204 is above and/or below a predetermined level. If the cold tank 204 is substantially full, the flow controller 400 determines if a cold tank temperature is at or below a threshold temperature (block 804). For example, the flow controller 400 may determine if a temperature of the hot tank 202 and/or a temperature of the fuel in the cold tank 204 is below the threshold temperature. If the cold tank temperature is at or below the threshold temperature, the flow controller 400 determines if the hot tank 202 is able to receive fuel from the cold tank 204 (block 806). For example, the flow controller 400 may determine a first level of fuel in the hot tank 202 via the hot tank fuel level sensor 404 and a second level of fuel in the cold tank 204 via the cold tank fuel level sensor 408. Based on the first level and the second level, the flow controller 400 may determine if the hot tank 204 has volume available to receive some or all of the fuel in the cold tank 204. If the hot tank 202 is not able to receive fuel from the cold tank 204, an engine is supplied with fuel from the hot tank 202 (block 808). For example, the flow controller 400 may control the third valve 334 to enable the fuel to flow from the hot tank 202 to the second feed tank 220 via the third bypass 330. The example method 800 then returns to block 802.

If the hot tank 202 is able to receive fuel from the cold tank 204 (block 806), the flow controller 400 determines if the heat source 302 is above a threshold temperature (block 810). If the heat source 302 is not above the threshold temperature, the example method 800 returns to block 802. If the heat source 302 is above the threshold temperature, the flow controller 400 flows fuel from the cold tank 204 through the heat source cooling system 312 to the hot tank 202 (block 812). As the fuel flows through the heat source cooling system 312, the example heat source 302 is cooled. The example method then returns to block 802.

Returning to block 802, if the cold tank 204 is not substantially full, the flow controller 400 determines if the fuel level in the hot tank 202 is sufficient to fill the cold tank 204 (block 814). If the fuel level in the hot tank 202 is sufficient to fill the cold tank 204, the engine(s) 108, 110 are supplied with fuel from a tank other than the hot tank 202 and the cold tank 204 (block 816). For example, the first engine 108 and/or the second engine 110 may be supplied with fuel from one or more of the tanks 214, 216, 218, 220, 222, 224, 226, 228, 230, 232 and 234. Fuel is flowed from the hot tank 202 to the fuel cooling system 308 to cool the fuel (block 818). The fuel cooling system 308 cools the fuel. The flow controller 400 determines if the heat source 302 is above the threshold temperature (block 820). If the heat source 302 is not above the threshold temperature, fuel is flowed from the fuel cooling system 308 to the cold tank 204 (block 822). The flow controller 400 determines if the fuel level of the cold tank 204 is above a predetermined level (block 824). In some examples, if the fuel level of the cold tank 204 is above the predetermined level, the example heat source 302 may be operated, and the fuel in the cold tank 204 may be used to cool the heat source 302. The example method 800 then returns to block 802.

Returning to block 820, if the heat source 302 is above the threshold temperature, the flow controller 400 determines if the cold tank temperature is at or below the threshold temperature (block 826). If the cold tank temperature is above the threshold temperature, the flow controller 400 flows fuel from the fuel cooling system 308 to the heat source cooling system 312 (block 828). For example, the flow controller 400 may control the second valve 328 to enable the fuel to bypass the cold tank 204. The example method then returns to block 802.

If the cold tank temperature is at or below the threshold temperature (block 826), the flow controller 400 flows fuel from the fuel cooling system 308 to the cold tank 204 (block 830). Then, flow controller 400 flows fuel from the cold tank 204 through the heat source cooling system 312 to the hot tank (block 812). As a result, the heat source 302 is cooled, and the example method returns to block 802.

If the cold tank 204 is substantially full (block 802) and the cold tank temperature is at or below the threshold temperature (block 804), the flow controller 400 determines if the fuel level in the hot tank 202 is at or below a threshold level (block 832). If the fuel level in the hot tank 204 is above the threshold level, the engine(s) 108, 110 are supplied with fuel from the cold tank 204 (block 834). In some examples, if the cold tank 204 is substantially full and the fuel level in the hot tank 202 is above the threshold level, fuel may not be flowed from the cold tank 204 to the hot tank 202 or from the hot tank 202 to the cold tank 204. Thus, the flow controller 400 may control the second valve 328 to flow the fuel to the first feed tank 230 via the second bypass 324 to decrease the level of fuel in the cold tank 204 to enable the cold tank 204 to receive fuel from the hot tank 202. In other examples, fuel from the hot tank 202 is used to supply the engine(s) 108, 110. If the fuel level in the hot tank 202 is below the threshold level, the engine(s) 108, 110 are supplied with fuel from a tank other than the hot tank 202 and the cold tank 204 (block 818).

If the cold tank 204 is not substantially full (block 802) and the fuel level in the hot tank 202 is not sufficient to fill the cold tank 204, the flow the flow controller 400 determines if a vehicle fuel level is below a predetermined level (block 900). For example, the flow controller 400 may determine an amount of fuel remaining in the aircraft 100. If the vehicle fuel level is at or above the predetermined level, the flow controller 400 fills the hot tank 202 with fuel from at least one of the tanks other than the hot tank 202 and the cold tank 204 (block 902). For example, the flow controller 400 may fill the hot tank 202 with fuel from one or more of the tanks 214, 216, 218, 220, 222, 224, 226, 228, 230, 232 and 234. In some examples, the flow controller 400 may monitor the vehicle fuel level via the vehicle fuel level sensor(s) 410. If the vehicle fuel level falls below the predetermined level, the flow controller 400 supplies the engine(s) 108, 110 with fuel from the hot tank 202 and the cold tank (block 904).

Figure 10:
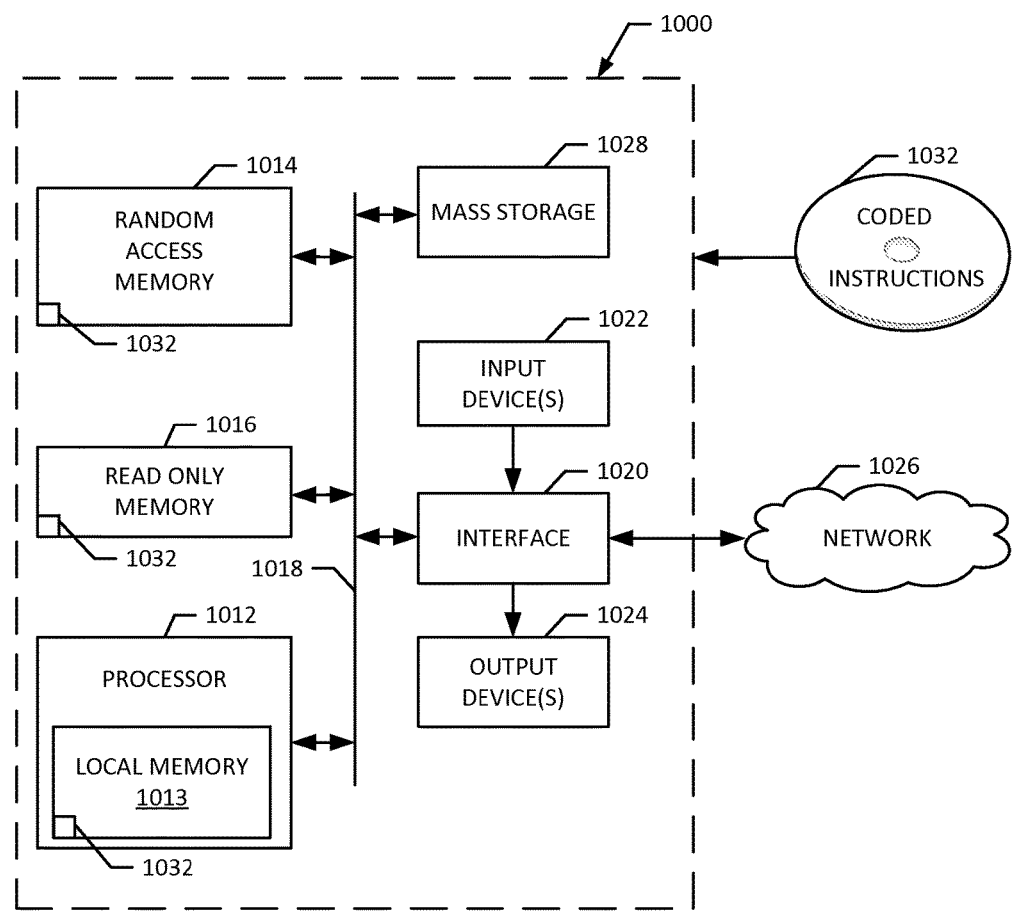
FIG. 10 is a block diagram of an example processor platform capable of executing the methods to implement the flow controller and thermal management system of FIGS. 3-4.

FIG. 10 is a block diagram of an example processor platform 1000 capable of executing the methods of FIGS. 5-9 to implement the flow controller 400 and/or the heat source thermal management system 200 of FIGS. 3-4. The processor platform 1000 can be, for example, a server, a computer, an Internet appliance, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, Redundant Disk Array (RAID) systems, and digital versatile disk (DVD) drives.

The coded instructions 1032 of FIG. 10 may be stored in the mass storage device 1028, in the volatile memory 1014, in the non-volatile memory 1016, and/or on a removable tangible computer readable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method, comprising:
    filling at least a portion of a first tank and a second tank with fuel, the fuel in the first tank having a first temperature and the fuel in the second tank having a second temperature less than the first temperature, the first tank and the second tank to be disposed on a vehicle;
    flowing the fuel from the second tank to an engine feed tank prior to flowing the fuel from the first tank to the engine feed tank;
    after the fuel in the second tank is less than a volume threshold, flowing the fuel from the first tank at the first temperature through a cooling system disposed between the first tank and the second tank via a first fuel line fluidly coupling the first tank to an inlet of the cooling system and fluidly coupling an outlet of the cooling system to the second tank, the cooling system to cool the fuel from the first temperature to the second temperature prior to the fuel entering the second tank;
    refilling at least a portion of the second tank with the fuel at about the second temperature;
    determining an operating temperature of a heat source disposed on the vehicle and comparing the operating temperature of the heat source to a heat source threshold temperature;
    in response to a determination that the operating temperature is greater than the heat source threshold temperature, flowing the fuel from the second tank having the second temperature to a heat exchanger positioned between the second tank and the first tank to cool the heat source via a second fuel line fluidly coupling the second tank to an inlet of the heat exchanger and an outlet of the heat exchanger to the first tank, the first fuel line being different than the second fuel line; and
    flowing the fuel from the heat exchanger to the first tank via the second fuel line.

2. The method of claim 1 further comprising supplying an engine of the vehicle with the fuel from at least one of the first tank or the second tank.

3. The method of claim 1 further comprising flowing the fuel from at least one of the first tank or the second tank based on an amount of fuel remaining in the vehicle.

4. The method of claim 1 further comprising controlling a flow rate of the fuel flowing from the second tank to the heat exchanger based on at least one of a mode of operation of the heat source or an amount of heat generated by the heat source.

5. A method comprising:
    providing fuel to an engine of an aircraft via a fuel feed system that includes a feed tank;
    cooling a heat source of the aircraft via cooled fuel provided by a heat source management system, the heat source management system to cool the heat source based on an operating temperature of the heat source, the heat source management system including a first tank having fuel at a first temperature and a second tank having the cooled fuel at a second temperature less than the first temperature, the heat source management system including a cooling system interposed in a first fuel line between the first tank and a second tank;
    flowing the cooled fuel from the second tank to the feed tank prior to flowing the fuel in the first tank to the feed tank in response to the operating temperature of the heat source being less than a heat source threshold temperature;
    directing the cooled fuel from at least one of the second tank or the cooling system into a heat exchanger to cool the heat source in response to the operating temperature being greater than or equal to the heat source threshold temperature, the heat exchanger being interposed in a second fuel line that is coupled to the second tank and the first tank, and the heat exchanger being in fluid communication with the cooling system via a bypass fuel line in fluid communication with the first fuel line between the cooling system and the second tank and the second fuel line between the second tank and the heat exchanger; and
    flowing the fuel from the heat exchanger into the first tank via the second fuel line.

6. The method of claim 5, wherein the second temperature is a predetermined temperature.

7. The method of claim 5, further including cooling the fuel from the first tank via the cooling system prior to the fuel entering the second tank.

8. The method of claim 5, further including storing the cooled fuel in the second tank when the cooled fuel from the cooling system is not needed by the heat source management system to cool the heat source.

9. The method of claim 5, further including filling the first tank of the heat source management system with the fuel having the first temperature.

10. The method of claim 5, further including cooling the fuel from the first temperature to the second temperature via the cooling system of the heat source management system, the cooling system to cool the fuel as the fuel flows from the first tank toward the second tank.

11. The method of claim 5, further including determining the operating temperature of the heat source disposed on the aircraft and comparing the operating temperature of the heat source to a heat source threshold temperature.

\* \* \* \* \*

UNITED STATES PATENT AND TRADEMARK OFFICE
CERTIFICATE OF CORRECTION

PATENT NO. : 10,081,439 B1
APPLICATION NO. : 13/922960
DATED : September 25, 2018
INVENTOR(S) : Bowman et al.

Page 1 of 1

It is certified that error appears in the above-identified patent and that said Letters Patent is hereby corrected as shown below:

In the Claims

Column 22, Line 21 (Claim 5): Delete "the" between "having" and "cooled fuel".

Signed and Sealed this
Twenty-seventh Day of November, 2018

Andrei Iancu
*Director of the United States Patent and Trademark Office*